(12) United States Patent
Kim et al.

(10) Patent No.: US 6,720,943 B1
(45) Date of Patent: Apr. 13, 2004

(54) DATA INTERFACE DEVICE

(75) Inventors: Seong Jin Kim, Seoul (KR); Yu Soong Kim, Inchon-shi (KR); Hyun Chang Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/395,639

(22) Filed: Sep. 14, 1999

(30) Foreign Application Priority Data

Apr. 12, 1999 (KR) .......................................... P99-12748

(51) Int. Cl.[7] ................................................. G09G 3/36
(52) U.S. Cl. ............................. 345/87; 345/99; 345/212
(58) Field of Search .......................... 345/87, 99, 204, 345/211, 212, 213; 709/231; 363/41; 375/376; 327/144; 359/265; 325/204

(56) References Cited

U.S. PATENT DOCUMENTS

| | | | |
|---|---|---|---|
| 5,226,058 A | | 7/1993 | Anderson et al. |
| 5,359,343 A | | 10/1994 | Nakamura |
| 5,437,060 A | | 7/1995 | Delamater et al. |
| 5,659,339 A | | 8/1997 | Rindal et al. |
| 5,757,338 A | | 5/1998 | Bassetti et al. |
| 5,870,294 A | * | 2/1999 | Cyr .............................. 363/41 |
| 5,943,382 A | * | 8/1999 | Li et al. ..................... 375/376 |
| 5,974,464 A | * | 10/1999 | Shin et al. .................. 709/231 |
| 6,014,123 A | * | 1/2000 | Jung ........................... 345/99 |
| 6,040,723 A | * | 3/2000 | Sato ........................... 327/144 |
| 6,046,735 A | * | 4/2000 | Bassetti et al. ............. 345/204 |
| 6,084,700 A | * | 7/2000 | Knapp et al. ................ 359/265 |

FOREIGN PATENT DOCUMENTS

| | | |
|---|---|---|
| DE | 19716095 | 11/1997 |
| EP | 0326643 | 8/1989 |
| EP | 0416423 | 8/1990 |
| EP | 0416423 A2 | 3/1991 |
| EP | 0664651 | 1/1994 |
| EP | 0704833 | 3/1996 |
| GB | 2311673 | 1/1997 |
| GB | 2311673 | 10/1997 |
| JP | 4-310699 | 11/1992 |
| JP | 6-250755 | 9/1994 |
| JP | 9-98152 | 10/1996 |
| JP | 9-289527 | 7/1997 |
| WO | 9000839 | 1/1990 |
| WO | 9014710 | 11/1990 |
| WO | WO 90/14710 | 11/1990 |
| WO | 9529542 | 11/1995 |
| WO | WO95/29542 | 11/1995 |

* cited by examiner

Primary Examiner—Dennis-Doon Chow
(74) Attorney, Agent, or Firm—Birch, Stewart, Kolasch & Birch, LLP

(57) ABSTRACT

A data interface device is constructed to minimize electromagnetic interference in a liquid crystal display device. The data interface device has a data input arranged to input data which is synchronized with a desired frequency of a data clock. A clock modulator modulates the data clock to provide a modulated clock signal having a frequency within a certain range of frequency so as to minimize EMI when data is transmitted using the data clock. A variable data transmission speed controller responds to the data clock and the modulated clock in such a manner that a transmission speed of the data is varied in a manner to minimize EMI.

19 Claims, 8 Drawing Sheets

DATA INTERFACE DEVICE

BACKGROUND OF THE INVENTION

1. Field of the Invention

This invention relates to a method of interfacing with data and a data interface apparatus, and more particularly, to a data interface method and apparatus which interfaces data so as to eliminate EMI caused during data transmission. Also, the present invention is directed to a method and apparatus for driving a liquid crystal panel so as to vary a data transmission speed such that EMI is eliminated. In addition, the present invention is directed to a monitor driving method and apparatus for driving a monitor such that EMI is eliminated by varying a data transmission speed.

2. Description of the Related Art

Data interface requirements of various display devices have been increasing because of the frequent transmission of text information, video information, and other information. Also, data interface requirements have greatly increased because the amount and type of data, such as audio information, is now regularly transmitted with such text, video and other information to the display devices. The text information and the video information must be transmitted at a high speed such that the text and video information is used at an appropriate time. Accordingly, the text information and the video information occupy a high frequency band.

As will be explained in more detail below, the inventors of the present application discovered that, as the frequency band of such video and text information increases, an electromagnetic interference, hereinafter referred to as "EMI", occurs in a data transmission line such as a data bus. Also, the EMI is also greatly increased at a display device such as a liquid crystal display ("LCD") and a monitor apparatus especially when such video, audio and text information are transmitted to and displayed thereon.

Problems with EMI were recognized in conventional devices to exist only at a source driver and EMI was thought to be caused only by the large distance between the ASIC drive IC to the contact pads of the data driver. A conventional solution was to reduce EMI at the source driver by inserting noise filters, such as an EMI reduction filter or LC filter, at an ASIC data drive IC. Thus, it was attempted to smooth every output signal from the ASIC drive IC by putting the EMI filter, a shield or a grounding gasket between a data output pin and the drive IC pad. This solution proved to be very expensive and the EMI filter or reduction device causes a delay in signal transmission from the data output pin and also adds an additional complicated manufacturing process.

Another related solution is shown in FIGS. 1 and 2 in which a two port or multi-port system is used such that frequency of data transmission is reduced to reduce EMI.

Thus, instead of using an EMI filter or shield, a controller changes the period of data transmission. Such a multiple data transmission scheme has been used for a data interface apparatus for use in a display device such as an LCD or monitor in order to reduce EMI.

However, in such a device, EMI is still a problem because data transmission occurs at the same location along the clock signal where the clock frequency is constant. That is, data transmission occurs at either at the rising edge or the falling edge of the constant clock signal. Also, the multiple data transmission scheme complicates the data transmission line and severely limits the design freedom and capabilities of the data interface apparatus and the display apparatus and monitor.

More specifically, an LCD uses a liquid crystal panel driving apparatus having a dual bus structure as shown in FIG. 1 so as to reduce an EMI. In FIG. 1, the liquid crystal panel driving apparatus includes source driving integrated circuits(ICs) 12 for driving signal lines in a liquid crystal panel 10, a gate driving IC 14 for driving gate lines in the liquid crystal panel 10, and a timing controller 16 for controlling timing of the source driving ICs 12 and the gate driving IC 14. The timing controller 16 responds to a data clock DCLK received from a clock line CKL as shown in FIG. 2 and vertical and horizontal synchronizing signals VSYN and HSYN from a synchronizing signal line SSL to control operation timing of the source driving ICs 12 and the gate driving IC 14. The source driving ICs 12 are supplied with a source control signal via a source control line SCL while the gate driving IC 14 is supplied with a gate control signal via a gate control line GCL. The source control signal includes a transmission clock TCLK, as shown in FIG. 2, for indicating a transmission period of the video data. The timing controller 16 transfers video data from an external bus EB to the source driving ICs 12.

In order to reduce an EMI generated when the video data is transferred to the source driving ICs 12, the timing controller 16 is connected to the source driving ICs 12 via first and second internal buses FIB and SIB. The first internal bus FIB transfers red(R), green(G) and blue(B) data FIRD, FIGD and FIBD, as shown in FIG. 2, for odd-numbered pixels to the source driving ICs 12, whereas the second internal bus SIB transfers R, G and B data SIRD, SIGD and SIBD, as shown in FIG. 2, for even-numbered pixels to the source driving ICs 12. Accordingly, the timing controller 16 divides video data ERD, EGD and EBD received from the external bus EB into odd-numbered pixel data FIRD, FIGD and FIBD and even-numbered pixel data SIRD, SIGD and SIBD. The video data includes R, G and B data, each of which comprises a 6 bit signal. Accordingly, the external bus EB includes 18 bit lines, and each of the first and second internal buses FIB and SIB includes 18 bit lines, too. The odd-numbered pixel data and the even-numbered pixel data is simultaneously supplied to the source driving ICs 12, whereby data at the first and second internal buses FIB and SIB has a frequency equal to one half of the data at the external bus EB.

In addition, a transmission clock at the source control line SCL also has a lower frequency, which is reduced by ½, compared to a data clock at the clock line CKL. For example, when the liquid crystal panel is an XGA-class panel, a frequency of the data at the external bus EB and a frequency of the data clock at the clock line CKL are 18 MHz and 65 MHz, respectively. A frequency of the data at the internal buses FIB and SIB and a frequency of the transmission clock at the source control line SCL are 9 MHz and 32.5 MHz, respectively, in the EMI measuring pattern. Accordingly, an EMI is reduced at a transmission line between the timing controller 16 and the source driving ICs 12.

In the liquid crystal panel driving apparatus as shown in FIG. 1, however, since a frequency of the data at the first and second internal buses FIB and SIB and a frequency of the transmission clock TCLK at the source control line SCL is locked, an EMI is not only significantly emitted at a frequency of the data and a harmonic frequency thereof, but also at a frequency of the clock and a harmonic frequency thereof. As a result, the liquid crystal panel driving apparatus of FIG. 1 fails to reduce an EMI below a desired, acceptable minimum level and within a range that has a negligible affect on the displayed image produced on the LCD or monitor.

In addition, U.S. Pat. No. 5,659,339 describes a device in which EMI is attempted to be reduced by phase-modulating a clock so as to spread out the EMI along the clock. However, this method only slightly reduces an amplitude of EMI and is not effective for significantly reducing or substantially eliminated EMI.

SUMMARY OF THE INVENTION

To overcome the problems described above, preferred embodiments of the present invention provide a data interface apparatus, a liquid crystal display apparatus, a monitor and method for transmitting data to a liquid crystal display or monitor, each of which is adapted to minimize and eliminate an EMI without complicating the structure or assembly process thereof.

According to at least one of the preferred embodiments of the present invention, a data interface apparatus is arranged to transfer data in such a manner that a speed of a clock used for data transmission is changed such that EMI is greatly reduced or substantially eliminated. It should be noted that the manner in which the clock speed used for data transmission is varied to eliminate EMI may include a plurality of variation schemes, including a pre-defined pattern of clock speed variation which is dependent upon, for example, a triangular wave or sinusoidal wave, a symmetric or asymmetric pattern, or a pattern which gradually changes the clock speed used for data transmission such that a data transmission speed is faster and then slower, or slower and then faster.

In addition, the specific mechanism used for varying the clock speed used for data transmission preferably includes a clock modulator in the form of an IC chip such as an ASIC chip, an electronic circuit or other electronic devices arranged to vary the clock speed used for data transmission to reduce EMI as described herein with respect to preferred embodiments of the present invention.

A data interface apparatus according to another preferred embodiment of the present invention includes a data input arranged to input data synchronized with a desired frequency of a data clock, a clock modulator arranged to modulate the data clock to provide a modulated clock having a frequency which is varied within a certain range of frequency band located around a desired target frequency, and a data timing controller responsive to the data clock and the modulated clock to vary a data transmission speed within a certain range determined to minimize EMI.

A liquid crystal panel driving apparatus according to still another preferred embodiment of the present invention includes a data input arranged to input video data, source driving circuits arranged to drive data lines in a liquid crystal panel, and a data interface unit arranged to transmit the video data to the source driving circuits such that a data transmission speed is varied to minimize EMI.

A liquid crystal panel driving apparatus according to still another preferred embodiment of the present invention includes a data input arranged to input video data synchronized with a desired frequency of data clock, source driving circuits arranged to drive data lines in a liquid crystal panel, a clock modulator arranged to modulate the data clock to provide a modulated clock having a frequency which is varied so as to minimize EMI, and a data timing controller responsive to the data clock and the modulated clock to transfer the video data to the source driving circuits such that a data transmission speed is varied within a certain range determined for minimizing EMI.

A monitor apparatus according to still another preferred embodiment of the present invention includes a data input arranged to input a video data, a data driver arranged to drive data lines with the video data, and a data scaling unit arranged to scale the video data from the data input and to supply scaled video data to the data driver such that a data transmission speed is varied within a certain range determined for minimizing EMI.

A monitor apparatus according to still another preferred embodiment of the present invention includes a data input arranged to input video data synchronized with a certain frequency of a data clock, a data driver arranged to drive data lines with the video data, a clock modulator arranged to modulate the data clock to provide a modulated clock having a frequency which is varied within a certain range of frequency band located around a desired target frequency, and a data scaling unit arranged to respond to the data clock and to scale the video data from the data input and to respond to the modulated clock to supply scaled video data to the data driver in such a manner that a data transmission speed is varied within a certain range to minimize EMI.

A monitor apparatus according to still another preferred embodiment of the present invention includes a signal converter arranged to convert an analog video signal into a digital video data, a data driver arranged to drive data lines with the video data, a clock generator arranged to generate a sampling clock, a clock modulator arranged to modulate the sampling clock into a modulated clock having a frequency which is varied within a certain range of frequency band and applying the modulated clock to the signal converter, to thereby vary a transmission speed of the digital data within a certain speed range selected to minimize EMI, and a data scaling unit arranged to scale the video data from the signal converter and to supply the scaled video data to the data driver.

BRIEF DESCRIPTION OF THE DRAWINGS

These and other features, elements, and advantages of the present invention will be apparent from the following detailed description of preferred embodiments of the present invention with reference to the accompanying drawings, in which.

DETAILED DESCRIPTION OF PREFERRED EMBODIMENTS

Figure 3:
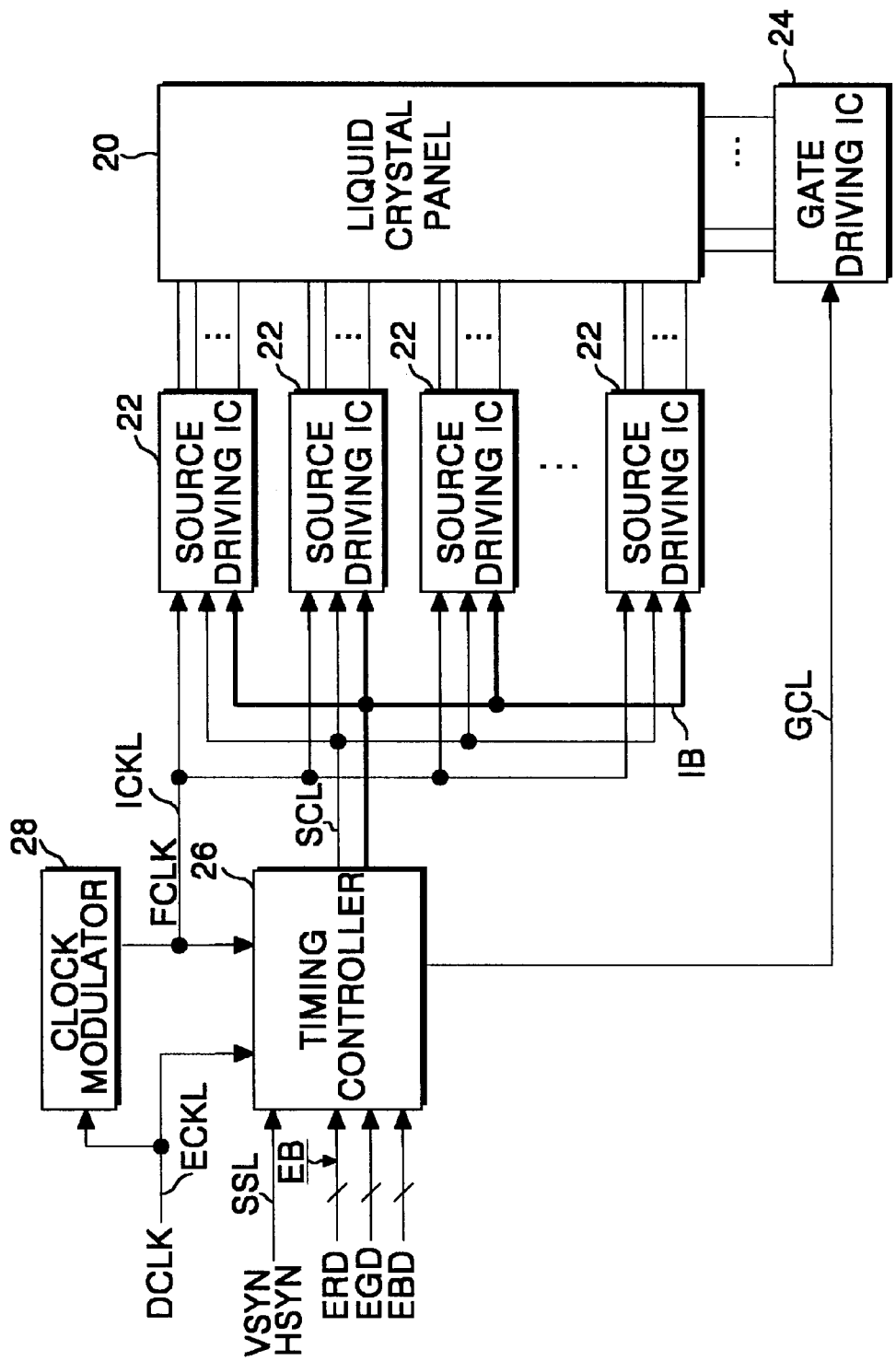
FIG. 3 is a schematic block diagram showing the configuration of a liquid crystal panel driving apparatus according to a preferred embodiment of the present invention.

Referring to FIG. 3, there is shown a liquid crystal driving apparatus according to one preferred embodiment of the present invention. The liquid crystal panel driving apparatus includes source driving ICs 22 for driving signal lines in a liquid crystal panel 20, and a gate driving IC 24 for driving gate lines in the liquid crystal panel 20.

Further, the liquid crystal panel driving apparatus includes a timing controller 26 for controlling timing of the source driving ICs 22 and the gate driving IC 24, and a clock modulator 28 for modulating a data clock. The timing controller 26 responds to a data clock DCLK received from an external clock line ECKL as shown in FIG. 4 and vertical and horizontal synchronizing signals VSYN and HSYN received from a synchronizing signal line SSL to control operation timing of the source driving ICs 22 and the gate driving IC 24.

The source driving ICs 22 are supplied with a source control signal via a source control line SCL while the gate driving IC 24 is supplied with a gate control signal via a gate control line GCL. The timing controller 26 transfers video data from an external bus EB to source driving ICs 22 connected to an internal bus IB. The video data includes R, G and B data ERD, EGD and EBD as shown in FIG. 4, each of which comprises a 6-bit signal. Accordingly, the external bus EB preferably includes 18 bit lines, and the internal bus IB preferably includes 18 bit lines, also.

Figure 4:
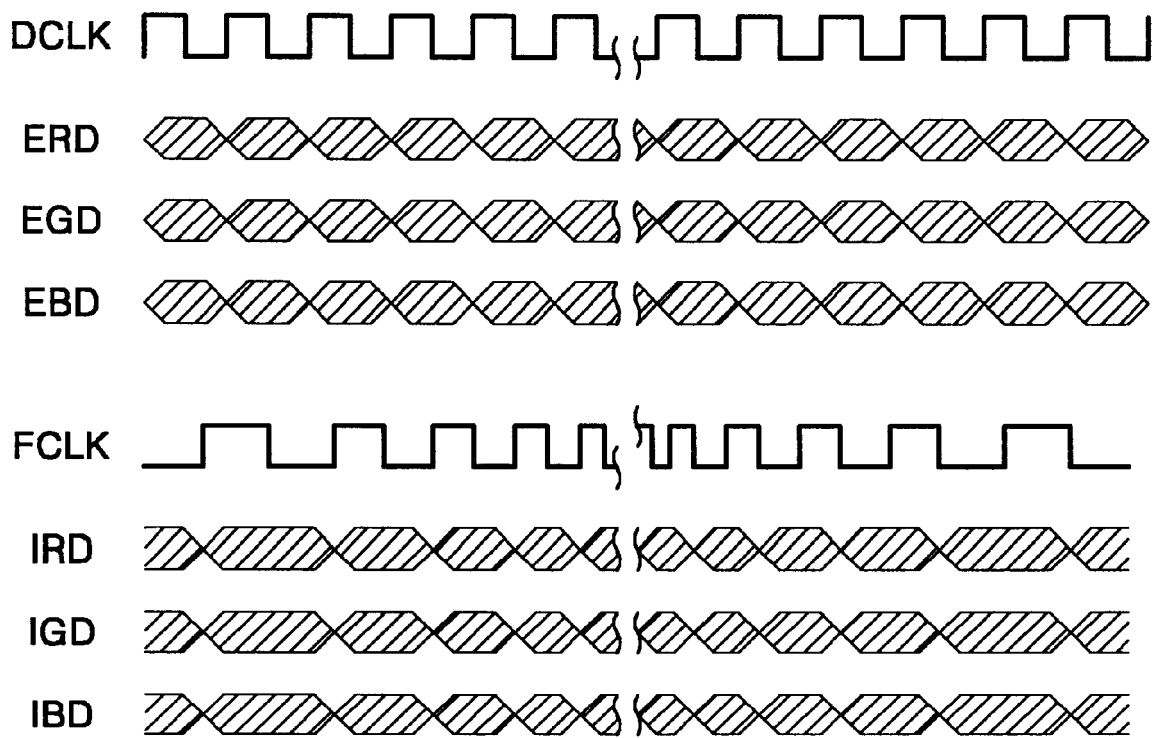
FIG. 4 illustrates operational waveform diagrams for each part of the driving apparatus in FIG. 3.

A clock modulator 28 frequency-modulates the data clock DCLK from the external clock line ECLK to produce a modulated clock signal FCLK as shown in FIG. 4. This modulated clock signal FCLK is selected to minimize EMI as will be described in more detail below.

More specifically, the modulated clock signal FCLK has a frequency which is changed in a manner to minimize EMI. More specifically, in one preferred embodiment, the frequency of the modulated clock signal FCLK increases or decreases gradually from an upper-limit frequency to a lower-limit frequency during each period. That is, a frequency of the modulated clock signal FCLK preferably increases gradually from the lower-limit frequency to the upper-limit frequency and thereafter the modulated clock signal FCLK preferably decreases gradually from the upper-limit frequency to the lower-limit frequency.

A frequency variation width of such a modulated clock FCLK signal in this preferred embodiment is preferably about ±1% to about ±50% based on a frequency of the data clock DCLK. For example, when a frequency of the data clock DCLK is about 65 MHz, a frequency of the modulated clock FCLK varies within a range of about 32.5 MHz to about 97.5 MHz(i.e., about ±50%) or a range of about 64.35 MHz to about 65.65 MHz(i.e., about ±1%) at about ±1% of the data clock DCLK frequency, where $1 \leq x \leq 50$.

In order to produce such a modulated clock FCLK in this preferred embodiment, the clock modulator 28 includes a frequency modulator (not shown) for increasing or decreasing a frequency of the data clock DCLK depending on a triangular waveform. The triangular waveform has an upward slope and a downward slope which preferably have the same absolute value.

It should be noted that the clock modulator 28 may be arranged to vary the frequency of the data clock according to other waveforms such as a sinusoidal waveform or a waveform that has another pattern which changes the frequency in a symmetric manner, an asymmetric manner, or other pattern arranged to minimize EMI. Also, the pattern may include a plurality of different of frequencies in each period, for example, changing from a large frequency to a medium frequency to a small frequency.

The modulated clock FCLK is commonly applied to the timing controller 26 and the source driving ICs 22 over an internal clock line ICLK. The timing controller 26 inputs R, G and B data ERD, EGD and EBD from the external bus EB in accordance with the data clock DCLK and outputs the same to the internal bus IB in accordance with the modulated clock FCLK. In other words, in the preferred embodiment described above, the timing controller 26 preferably gradually. increases a transmission speed of data at the internal bus IB and thereafter preferably gradually decreases the data transmission speed during each constant-length modulation period. However, as noted above, the timing controller 26 can change the transmission speed according to a suitable pattern which is determined to minimize EMI.

With reference to FIG. 4, R, G and B data ERD, EGD and EBD at the external bus EB are transmitted at a constant speed, whereas a transmission speed of R, G and B data IRD, IGD and IBD at the internal bus IB increases preferably gradually and thereafter preferably decreases gradually every modulation period. As described above, a frequency of R, G and B data IRD, IGD and IBD at the internal bus IB varies periodically and repeatedly, thereby greatly enlarging a spectrum width of these data and the modulated clock FCLK while significantly decreasing a spectrum level of these data and the modulated clock FCLK.

Also, an EMI generated from the internal bus IB is distributed across a wide frequency band. As a result, an EMI is minimized at the transmission line between the timing controller 26 and the source driving ICs 22.

It should be noted that the clock modulator 28 can be separate from the timing controller. However, it is preferred that the clock modulator 28 is integral with the timing controller 26 so that a fabricating process of the liquid crystal panel driving apparatus in FIG. 3 is greatly simplified.

As noted above, the mechanism for varying the clock speed used for data transmission is preferably a clock modulator 28, which may take the form of an IC chip, an ASIC chip, other types of electronic circuits or other suitable devices for varying frequencies of data transmission.

Figure 5:
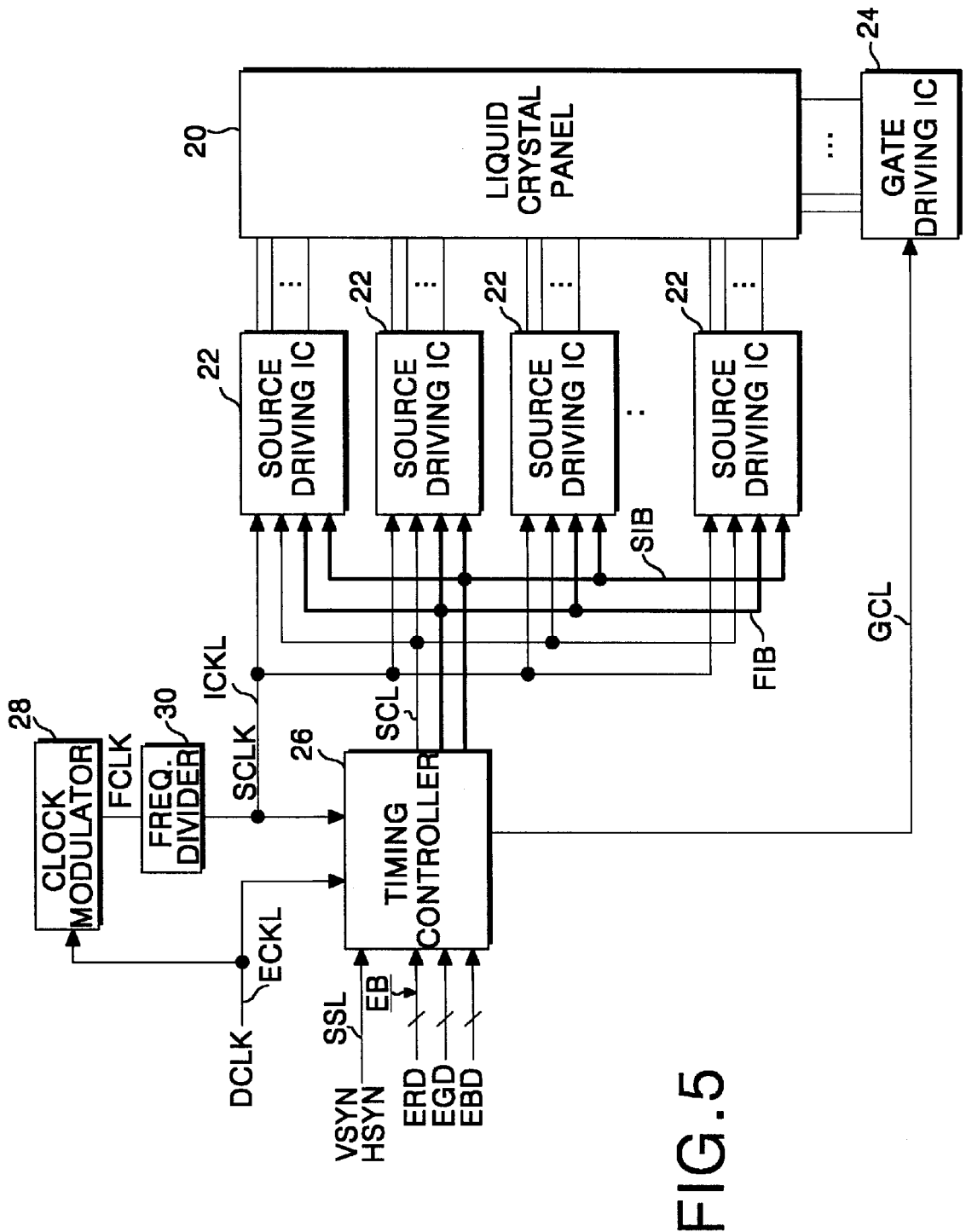
FIG. 5 is a schematic block diagram showing the configuration of a liquid crystal panel driving apparatus according to another preferred embodiment of the present invention.

Referring now to FIG. 5, there is shown a liquid crystal panel driving apparatus according to another preferred embodiment of the present invention. The liquid crystal panel driving apparatus in FIG. 5 is preferably similar to the liquid crystal panel driving apparatus in FIG. 3 except that the liquid crystal display panel driving apparatus additionally includes a frequency divider 30 connected to a timing controller 26 by way of first and second internal buses FIB and SIB and, at the same time, connected between the timing controller 26 and a clock modulator 28.

The first internal bus FIB transfers R, G and B data FIRD, FIGD and FIBD for odd-numbered pixels to source driving ICs 22 while the second internal bus SIB transfers R, G and B data SIRD, SIGD and SIBD for even-numbered pixels to the source driving ICs 22. Accordingly, the timing controller 26 divides video data ERD, EGD and EBD from an external bus EB into the odd-numbered pixel data FIRD, FIGD and FIBD and the even-numbered pixel data SIRD, SIGD and SIBD. The odd-numbered pixel data and the even-numbered pixel data is simultaneously supplied to the source driving ICs 22 as mentioned above, so that data at the first and second internal buses FIB and SIB has a frequency corresponding to one half of the frequency of data at the external bus EB.

In addition, a clock applied to the source driving ICs 22 also has a lower frequency, which is reduced by ½, as compared to a data clock DCLK. For example, when a liquid crystal panel 20 is an XGA-class panel, a frequency of the data at the external bus EB and a frequency of the data clock DCLK at the clock line ECKL are 18 MHz and 65 MHz, respectively, while a frequency of the data at the internal buses FIB and SIB and a frequency of the clock applied to the source driving ICs 22 are 9 MHz and 32.5 MHz, respectively. As a result, an EMI is minimized at a transmission line between the timing controller 16 and the source driving ICs 12.

Meanwhile, the frequency divider 30 frequency-divides a modulated clock FCLK received from a clock modulator 28, hereinafter referred to as "first modulated clock," into ½ of the frequency so as to generate a second modulated clock.

Figure 6:
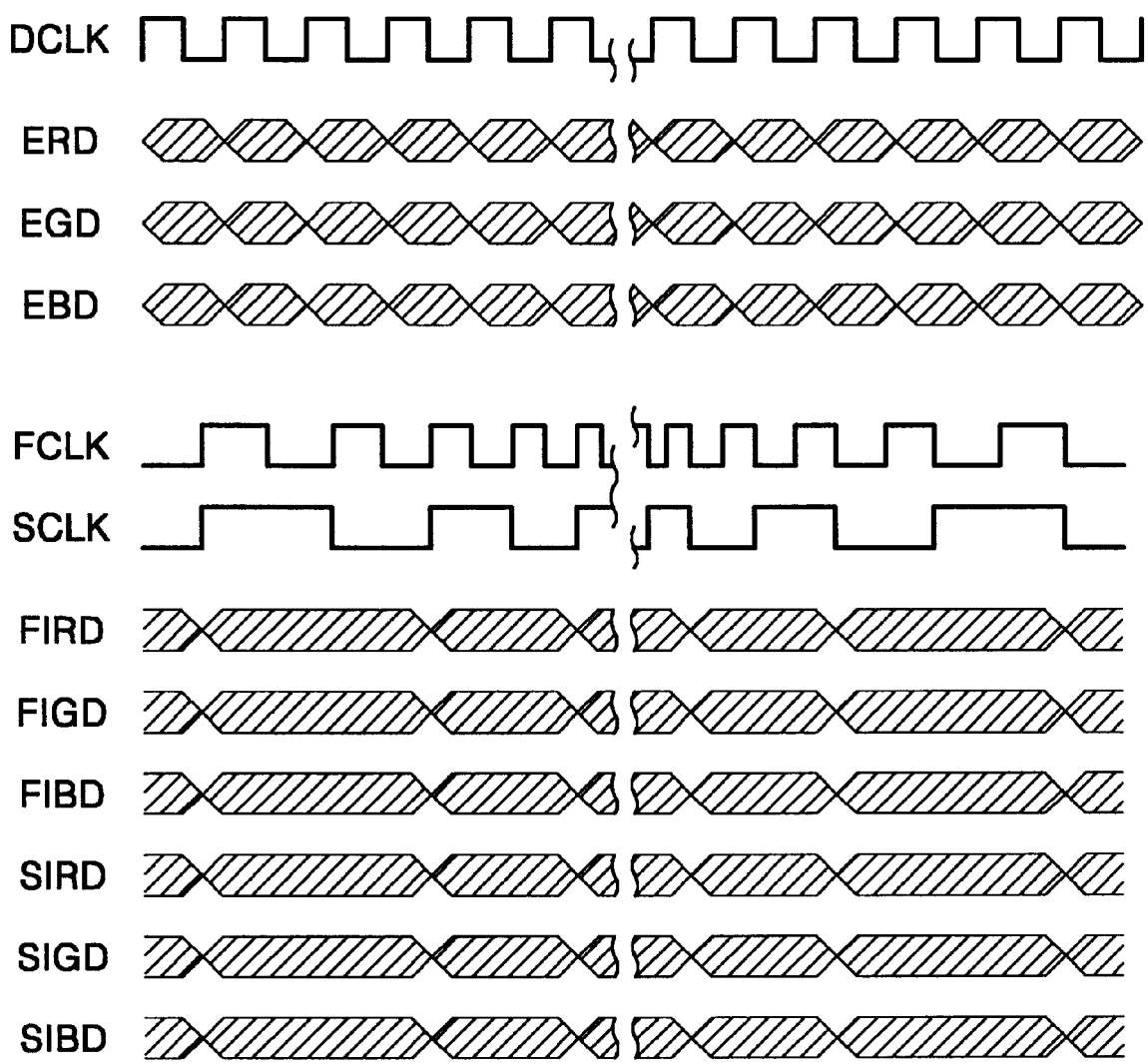
FIG. 6 illustrates operational waveform diagrams for each part of the driving apparatus in FIG. 5.

As shown in FIG. 6, the second modulated clock SCLK has a frequency which preferably increases or decreases from the upper-limit frequency to the lower-limit frequency during each modulation period, which is similar to the first modulated clock FCLK. A frequency variation width of such second modulated clock SCLK is preferably about ±1% to about ±50% based on one half of a frequency of the data clock DCLK. For instance, when a frequency of the data clock DCLK is about 65 MHz, a frequency of the second modulated clock SCLK varies within a range of about 16.25 MHz to about 48.75 MHz(i.e., about ±50%) or a range of about 32.825 MHz to about 33.75 MHz(i.e., about ±1%). However, as noted above, the frequency variation can be achieved-according to many different patterns selected for minimizing EMI.

The second modulated clock SCLK is commonly applied to the timing controller 26 and the source driving ICs 22 over an internal clock line ICLK. The timing controller 26 divides R, G and B data ERD, EGD and EBD input from the external bus EB in a state in which the data ERD, EGD, EBD is synchronized with the data clock DCLK, into odd-numbered R, G and B data FIRD, FIGD and FIBD and even-numbered R, G and B data SIRD, SIGD and SIBD. The timing controller 26 outputs the odd-numbered R, G and B data FIRD, FIGD and FIBD to the first internal bus FIB and outputs the even-numbered R. G and B data SIRD, SIGD and SIBD to the second internal bus SIB depending on the second modulated clock SCLK. In other words, the timing controller 26 preferably gradually increases a data transmission speed at the internal bus IB and thereafter preferably gradually decreases the data transmission speed during each modulation period. The timing controller can also use other frequency variation patterns to change data transmission speed at the internal bus to reduce EMI as described above.

With reference to FIG. 6, R, G and B data ERD, EGD and EBD at the external bus EB are transmitted at a constant speed, whereas transmission speeds of the odd-numbered R, G and B data FIRD, FIGD and FIBD at the first internal bus FIB and the even-numbered R, G and B data SIRD, SIGD and SIBD at the second internal bus SIB increase preferably gradually and thereafter preferably decrease gradually during each modulation period. As described above, frequencies of the odd-numbered R, G and B data FIRD, FIGD and FIBD at the first internal bus FIB and the even-numbered R, G and B data SIRD, SIGD and SIBD at the second internal bus SIB vary periodically and repeatedly, thereby greatly enlarging a spectrum width of these data and the second modulated clock SCLK, while greatly decreasing a spectrum level of these data and the second modulated clock SCLK.

Also, an EMI generated from the first and second internal buses FIB and SIB also is distributed across a wide frequency band so as to be minimized. This will become apparent from FIG. 7A and FIG. 7B.

Figure 1:
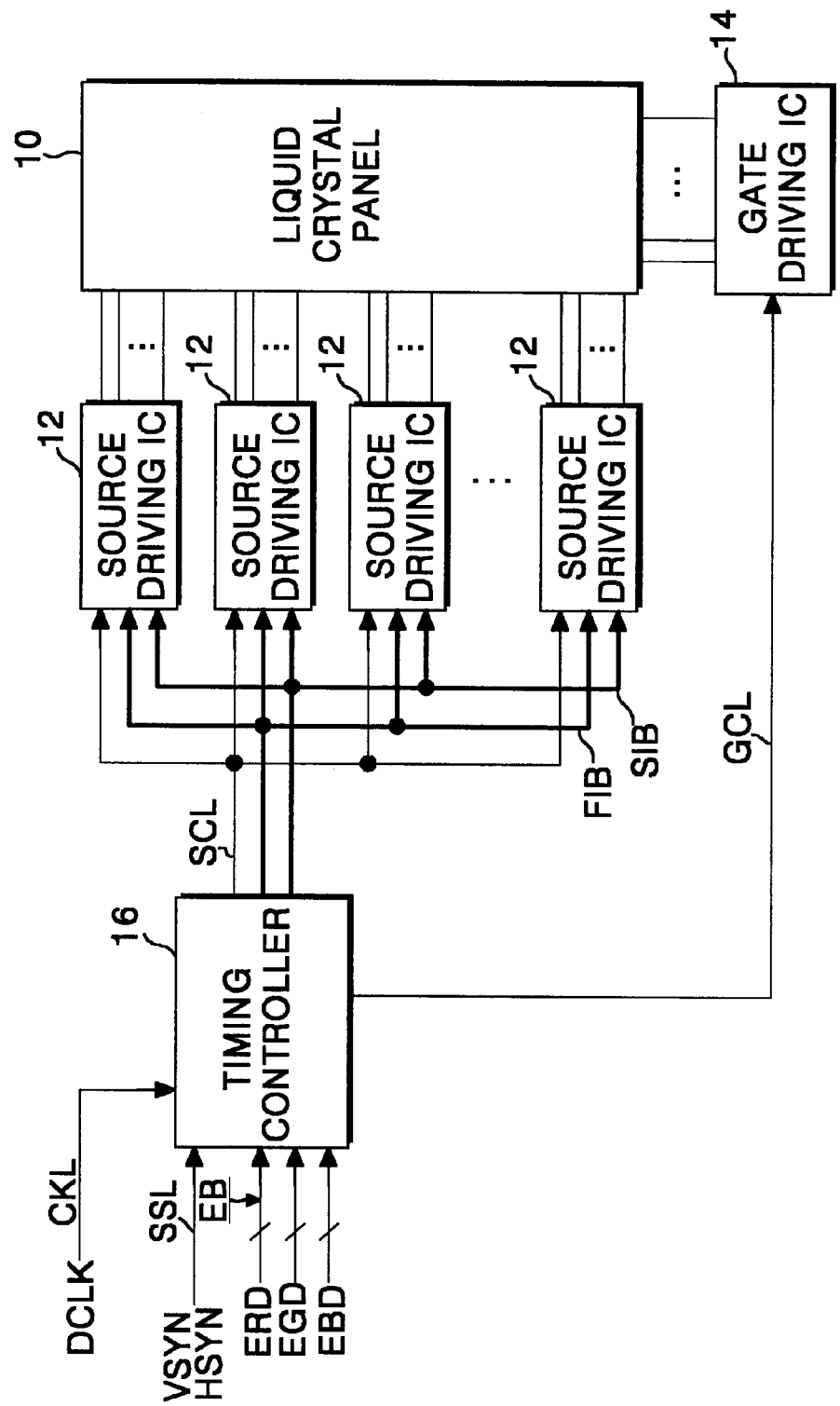
FIG. 1 is a schematic block diagram showing the configuration of a conventional liquid crystal panel driving apparatus.
Figure 2:
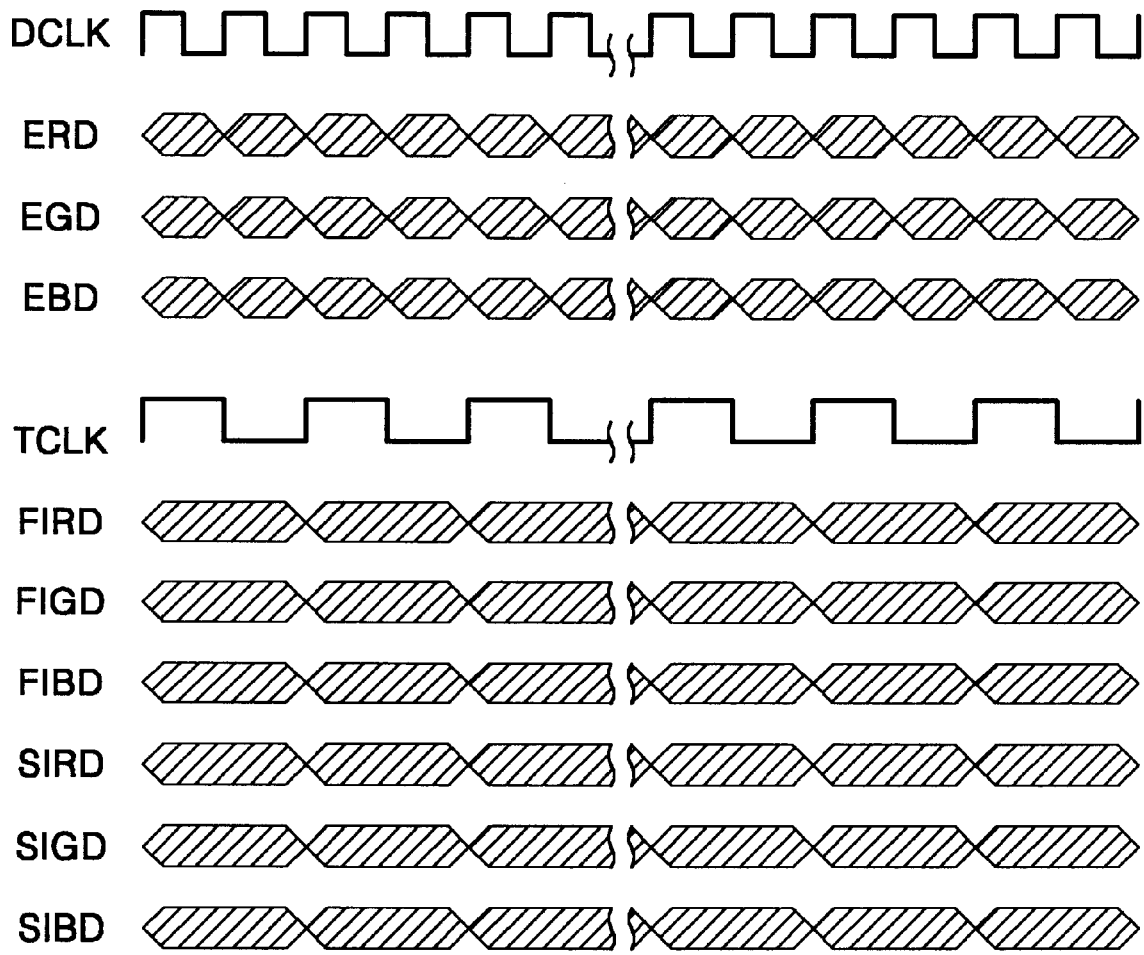
FIG. 2 illustrates operational waveform diagrams for each part of the driving apparatus in FIG. 1.
Figure 7A:
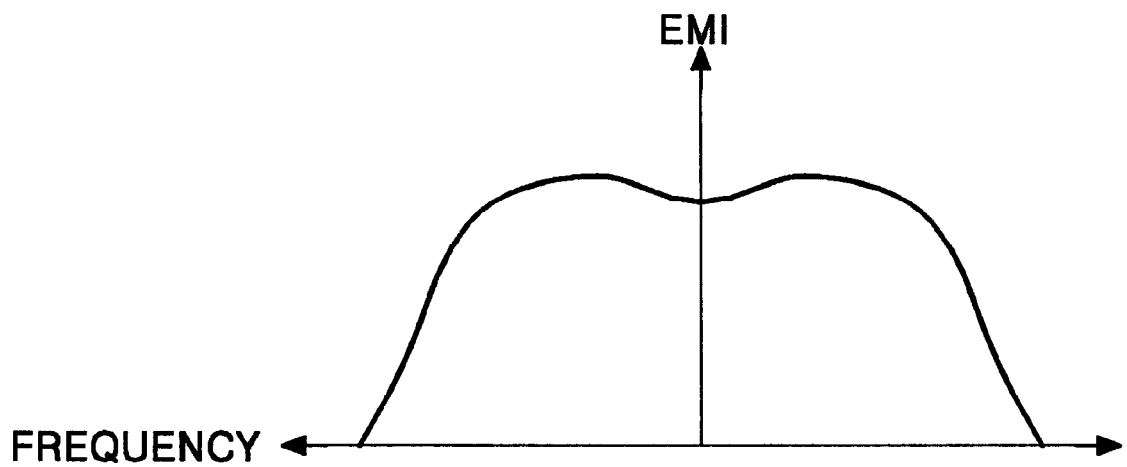
FIG. 7A is a characteristic graph for representing a frequency distribution of an EMI generated from the liquid crystal panel driving apparatus in FIG. 5.
Figure 7B:
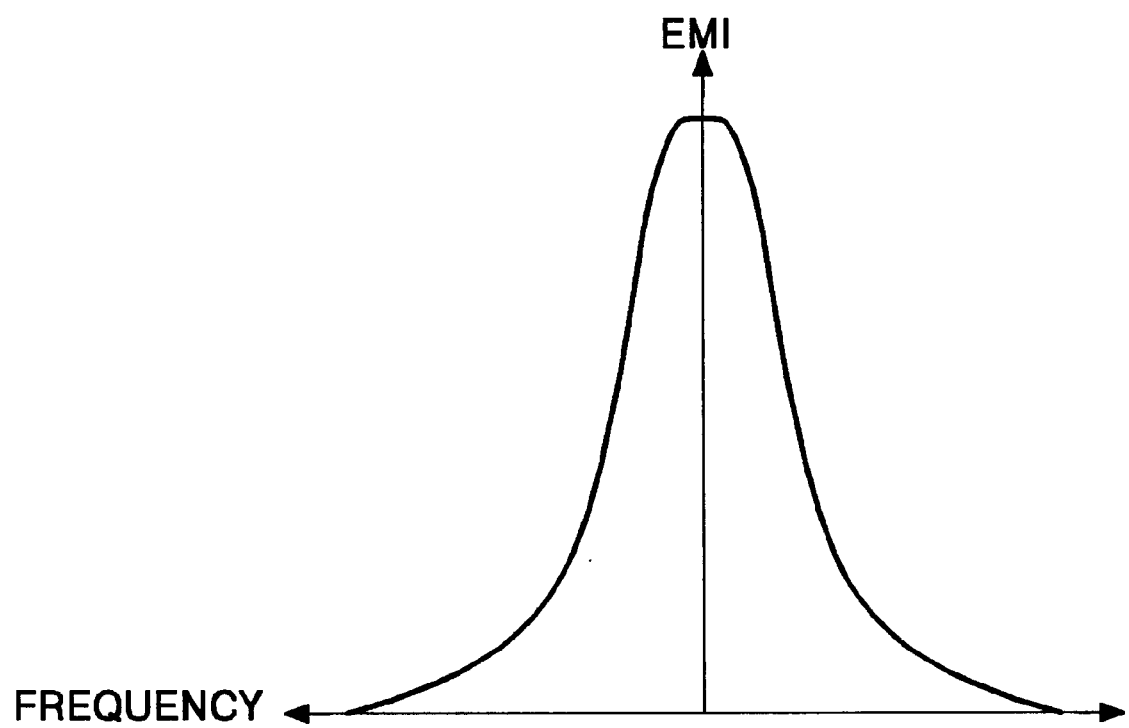
FIG. 7B is a characteristic graph for representing a frequency distribution of an EMI generated from the liquid crystal panel driving apparatus in FIG. 1.

FIG. 7A represents a frequency characteristic of an EMI generated from the liquid crystal panel driving apparatus in FIG. 5 while FIG. 7B represents a frequency characteristic of an EMI generated from the liquid crystal panel driving apparatus in FIG. 1. In FIG. 7A, the EMI is distributed across a wide frequency band, but has a low level. On the other hand, in FIG. 7B, the EMI is concentrated in a narrow frequency band and has a high level.

As described above, an EMI is minimized and reduced to a level below a limit value at the transmission line between the timing controller 26 and the source driving ICs 22. The clock modulator 28 and the frequency divider 30 can be integral to the timing controller 26 as noted above to simplify the fabricating process of the liquid crystal panel driving apparatus in FIG. 5. The clock modulator 28 or other element for changing the frequency of the clock used for data transmission may be in the form of an IC chip such as an ASIC chip, other forms of electronic circuits or elements, which are arranged to vary the frequency of the clock used for data transmission so as to minimize EMI.

Figure 8:
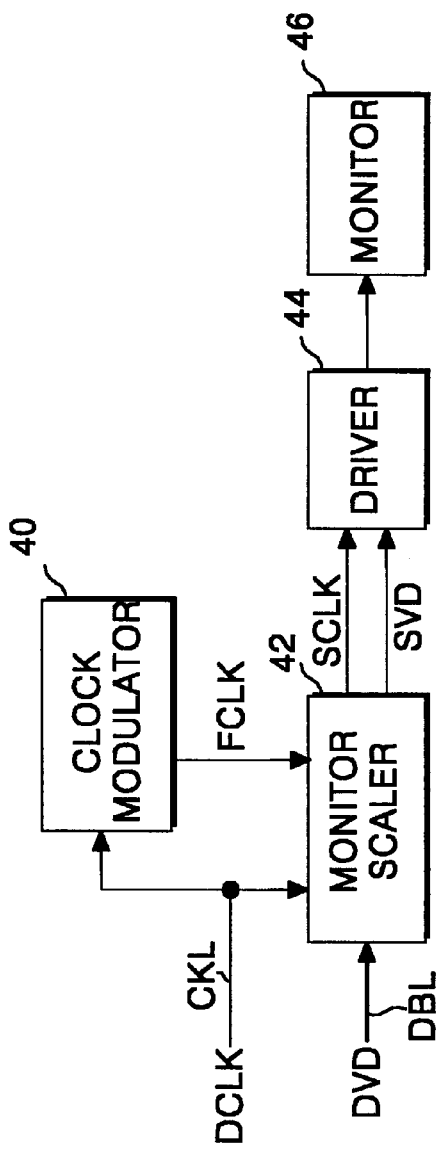
FIG. 8 is a schematic block diagram showing the configuration of a monitor device according to a preferred embodiment of the present invention.

Referring to FIG. 8, there is shown a monitor apparatus according to a preferred embodiment of the present invention. The monitor apparatus includes a clock modulator 40 and a monitor scaler 42 for commonly receiving a data clock DCLK from a clock line CKL, and a driver 44 and a monitor 46 which are connected in cascade to the monitor scaler 42. The clock modulator 40 frequency-modulates the data clock DCLK from the clock line CKL to generate a first modulated clock FCLK.

The first modulated clock FCLK has a frequency which increases or decreases preferably gradually from the upper-limit frequency to the lower-limit frequency during each period. A frequency variation width of such a first modulated clock FCLK is preferably about ±1% to about ±50% based on a frequency of the data clock DCLK. For instance, when a frequency of the data clock DCLK is about a frequency of the first modulated clock FCLK varies within a range of about 32.5 MHz to about 97.5 MHz(i.e., about ±50%) or a range of about 64.35 MHz to about 65.65 MHz(i.e., about ±1%). As noted above, the frequency variation pattern may be something other than gradually increasing and gradually decreasing as long as the frequency variation minimizes EMI.

In order to produce such a first modulated clock FCLK, the clock modulator 40 included in this preferred embodiment includes a frequency modulator (not shown) for increasing or decreasing a frequency of the data clock DCLK depending on a triangular waveform. The triangular waveform has an upward slope and a downward slope which have the same absolute value. The monitor scaler 42 responds to a data clock DCLK from a clock line CKL to input a digital video data DVD from a data bus line DBL and, at the same time, scales the input digital video data DVD to fit to the resolution of the monitor panel. Also, the monitor scaler 42 supplies the scaled video data SVD to the driver 44 along with the second modulated clock SCLK in such a manner to be synchronized with the first modulated clock FCLK received from the clock modulator 40.

Accordingly, the scaled video data SVD applied to the driver 44 is transferred quickly and then changing preferably gradually to be transferred slowly during each modulation period. The second modulated clock SCLK also has a period which gradually changes from fast and to slow during each modulation period, similar to the first modulated clock FCLK.

This change in data clock frequency may be such that the pattern is sinusoidal, symmetric, asymmetric, or includes many different frequencies, as described above.

The driver 44 responds to the second modulated clock SCLK to input the scaled video data SVD, thereby driving the monitor 46. As described above, a frequency of the scaled video data SVD applied to the driver 44 and a frequency of the second modulated clock SCLK preferably vary gradually and repeatedly during each modulation period, so that spectrum widths of the scaled video data SVD and the second modulated clock SCLK are greatly increased and become wide and spectrum levels of the scaled video data SVD and the second modulated clock SCLK are greatly decreased and become very low. Accordingly, an EMI generated between the monitor scaler 42 and the driver 44 also is distributed across a very wide frequency band and has a very low level. As a result, an EMI in the monitor device of FIG. 8 is minimized.

Figure 9:
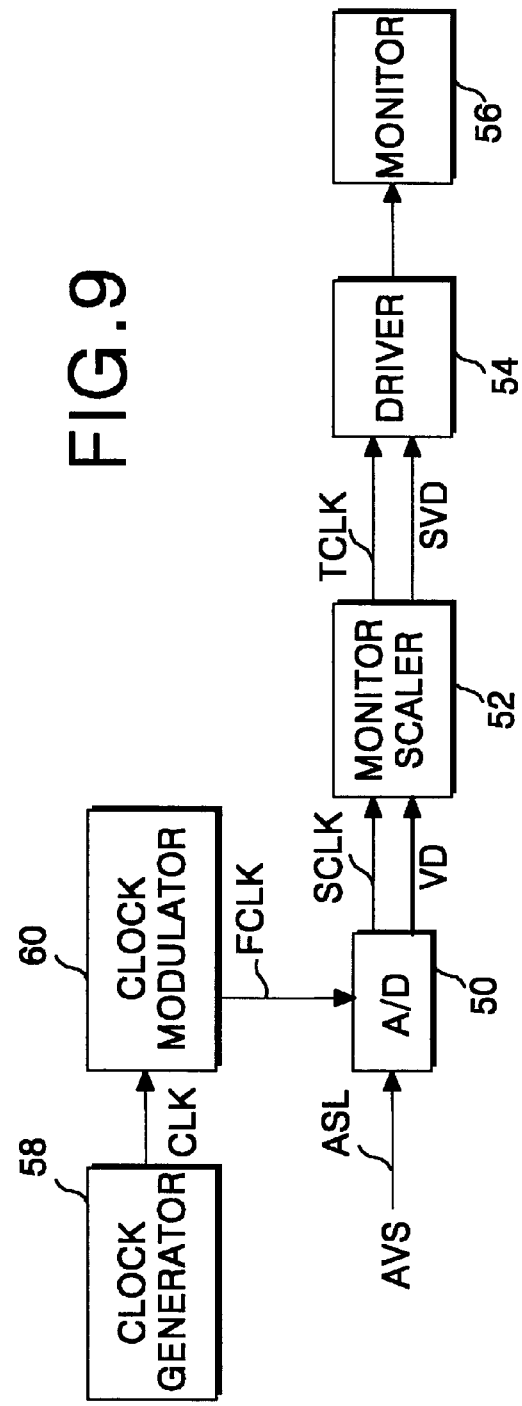
FIG. 9 is a schematic block diagram showing the configuration of a monitor device according to another preferred embodiment of the present invention.

Referring to FIG. 9, there is shown a monitor device according to another preferred embodiment of the present invention. The monitor device -includes an analog to digital converter 50, hereinafter referred to as "AD converter", a monitor scaler 52, a driver 54 and a monitor 56, that are connected, in cascade, to an analog signal line ASL, and a clock modulator 60 connected between a clock generator 58 and the AD converter 50. The clock generator 58 generates a sampling clock CLK with a constant period (or frequency). The clock modulator 60 frequency-modulates the sampling clock CLK to produce the first modulated clock FCLK.

According to this preferred embodiment, the first modulated clock FCLK has a frequency which preferably increases or decreases gradually from the upper-limit frequency to the lower-limit frequency during each period. A frequency variation width of such a first modulated clock FCLK is preferably about ±1% to about ±50% based on a frequency of the sampling clock CLK. For instance, when a frequency of the sampling clock CLK is about 65 MHz, a frequency of the first modulated clock FCLK varies within a range of about 32.5 MHz to about 97.5 MHz (i.e., about ±50%) or a range of about 64.35 MHz to about 65.65 MHz(i.e., ±1%).

In order to produce such a first modulated clock FCLK, the clock modulator 60 includes a frequency modulator(not shown) for increasing or decreasing a frequency of the sampling clock CLK depending on a particular pattern such as a triangular waveform, for example. The triangular waveform has an upward slope and a downward slope which have the same absolute value. The AD converter 50 samples an analog video signal AVS from an analog signal line ASL for every frequency of the first modulated clock FCLK and codes the sampled signal to thereby produce a digital video data VD. This digital video data VD is transferred quickly and then gradually changes to be transferred slowly during each modulation period. As noted above, other frequency variation patterns may also be used for changing data transmission speed to minimize EMI.

Such digital video data VD is supplied to the monitor scaler 52 along with the second modulated clock SCLK. The second modulated clock SCLK also preferably has a period which becomes gradually faster and thereafter gradually slower during each modulation period in a manner which is similar to the first modulated clock FCLK. However, the second modulated clock SCLK can be delayed by a certain phase compared with the first modulated clock FCLK.

The monitor scaler 52 responds to the second modulated clock SCLK from the AD converter 50 to input a video data VD from the AD converter 50 and, at the same time, scales the input video data VD to fit to the resolution of the monitor panel. Also, the monitor scaler 52 supplies the scaled video data SVD to the driver 54 such that the scaled video data is synchronized with the second modulated clock SCLK received from the AD converter 50 and, at the same time, supplies the third modulated clock TCLK. Accordingly, the scaled video data SVD applied to the driver 54 is preferably transferred gradually more quickly and thereafter gradually more slowly during each modulation period. The third modulated clock TCLK also has a period which preferably becomes gradually faster and thereafter gradually slower during each modulation period in such a manner similar to the first and second modulated clocks FCLK and SCLK. However, the third modulated clock TCLK can be delayed by a certain phase difference compared with the second modulated clock SCLK. The driver 54 responds to the third modulated clock TCLK to input the scaled video data SVD, thereby driving the monitor 56.

As described above, a frequency of the scaled video data SVD applied to the driver 54 from the AD converter 50 and a frequency of the third modulated clock TCLK preferably vary gradually and repeatedly during each period, so that spectrum widths of the scaled video data SVD and the third modulated clock TCLK are greatly increased and become very wide and spectrum levels of the scaled video data SVD and the third modulated clock TCLK are greatly decreased and become very low.

Accordingly, an EMI generated between the monitor scaler 52 and the driver 54 also is distributed across a wide frequency band and has a very low level. As a result, an EMI in the monitor device of FIG. 9 is restrained.

As described above, in the data interfacing device according to various preferred embodiments of the present invention, frequency of the data and the clock used for data transmission is changed in such a manner that EMI is minimized. Accordingly, an EMI generated by signals from the data interfacing device is distributed across a wide frequency band. As a result, the EMI is greatly reduced and minimized.

Further, in a liquid crystal panel driving apparatus or a monitor device, according to various preferred embodiments of the present invention, frequency of the data and the clock used for data transmission is changed during each period. Accordingly, an EMI generated in the liquid crystal panel or monitor driving apparatus is distributed across a wide frequency band. As a result, the EMI is minimized and substantially eliminated.

Although the present invention has been explained with reference to preferred embodiments shown in the drawings described above, it should be understood to the ordinary skilled person in the art that the invention is not limited to the above-described preferred embodiments, but rather that various changes or modifications thereof are possible without departing from the spirit of the invention. Accordingly, the scope of the invention shall be determined only by the appended claims and their equivalents.

What is claimed is:

1. A data interface apparatus for a display device, comprising:
   a data input supplying data signals;
   a data driver responsive to a control signal and arranged to drive the display device;
   a clock modulator arranged to modulate a base clock and to provide a modulated clock having a frequency which is varied within a frequency band of about ±x% of a base clock frequency where $1 \leq x \leq 50$; and
   a data transmission unit arranged to receive the data signals from the data input in response to the base clock and to transmit the data signals to the data driver according to the modulated clock such that a data transmission speed of the data signals is varied to reduce EMI,
   wherein the modulated clock is commonly applied to the data transmission unit and the data driver, and the data driver simultaneously transfers the data signals to the display device in response to the modulated clock and the control signal.

2. A data interface apparatus according to claim 1, wherein the modulated clock is provided for transmitting the data signals according to a certain timing defined by the modulated clock, and the data transmission unit is adapted to vary a speed of the modulated clock to reduce EMI.

3. A data interface apparatus according to claim 1, wherein the data transmission unit varies the speed of the modulated clock according to a predetermined pattern.

4. A data interface apparatus according to claim 3, wherein the pattern is based on one of a triangular waveform, a sinusoidal waveform, a symmetric waveform, an asymmetric waveform, and a pattern including multiple different frequencies.

5. A data interface apparatus according to claim 1, wherein the clock modulator is integral with the data transmission unit.

6. A data interface apparatus according to claim 5, wherein the clock modulator comprises one of an electronic circuit, an IC chip, an ASIC chip and a plurality of electronic circuit elements.

7. A data interface apparatus according to claim 5, wherein the data transmission unit clock includes a frequency divider arranged to modulate the modulated clock and to provide a second modulated clock commonly applied to the data driver and the data transmission unit, the second modulated clock being synchronized with the modulated clock.

8. A data interface apparatus according to claim 7, further comprising a data timing controller responsive to the modulated clock and arranged to transfer the data such that a data transmission speed is varied within a certain range.

9. A display apparatus, comprising:
   a data input supplying data signals;
   a data driver responsive to a control signal and arranged to drive a display panel with the data signals;
   a clock modulator arranged to modulate a base clock and to provide a modulated clock having a frequency which is varied within a frequency band of about ±x% of a base clock frequency where $1 \leq x \leq 50$; and
   a data transmission unit arranged to receive the data signals from the data input in response to the base clock and to transmit the data signals to the data driver according to the modulated clock such that a data transmission speed of the data signals is varied to reduce EMI,
   wherein the modulated clock is commonly applied to the data transmission unit and the data driver, and the data driver simultaneously transfers the data signals to the display device in response to the modulated clock and the control signal.

10. The display apparatus according to claim 9, wherein the display panel is a liquid crystal display.

11. The display apparatus according to claim 9, wherein the display panel is a monitor including a liquid crystal display.

12. A liquid crystal panel driving apparatus, comprising:
    a video data input arranged to input video data;
    source driving circuits responsive to a control signal and arranged to drive data lines of the liquid crystal panel;
    a clock modulator arranged to modulate a base clock and to provide a modulated clock having a frequency which is varied within a frequency band of about ±x% of a base clock frequency where $1 \leq x \leq 50$; and
    a data interface arranged to receive the video data responsive to the base clock and transmit the video data to the source driving circuits according to the modulated clock in such a manner that a transmission speed of the video data is varied to reduce EMI,
    wherein the modulated clock is commonly applied to the data transmission unit and the data driver, and the data driver simultaneously transfers the data signals to the display device in response to the modulated clock and the control signal.

13. A liquid crystal panel driving apparatus, comprising:
    a data input arranged to input a video data synchronized with a desired frequency of data clock;
    source driving circuits responsive to a control signal and arranged to drive data lines of the liquid crystal panel;
    a clock modulator arranged to modulate the data clock and to provide a modulated clock having a frequency which is varied within a frequency band of about ±x% of the data clock frequency, where $1 \leq x \leq 50$, to reduce EMI; and
    a data timing controller arranged to receive the video data in response to the data clock transfer the video data to the source driving circuits such that a transmission speed is varied within a certain range,
    wherein the modulated clock is commonly applied to the data interface and the source driving circuits, and the source driving circuits simultaneously transfer the video data to the display device in response to the modulated clock and the control signal.

14. A monitor apparatus, comprising:
    a video data input arranged to input video data;
    a data driver arranged to drive a display panel with the video data;
    a clock modulator arranged to modulate a base clock and to provide a modulated clock having a frequency which is varied within a frequency band of about ±x% of a base clock frequency where $1 \leq x \leq 50$; and
    a data scaler arranged to scale the video data received from the data input and to supply the scaled video data to the data driver according to the first modulated clock such that a transmission speed of the data is varied within a certain range, wherein the data scaler generates a second modulated clock synchronized with the first modulated clock and outputs the second modulated clock,
    wherein the data driver simultaneously transfers the scaled video data to the display panel in response to the second modulated clock.

15. The monitor apparatus as claimed in claim 14, wherein the display panel includes a liquid crystal panel.

16. A monitor apparatus, comprising:
- a video data input arranged to input a video data synchronized with a frequency of a data clock;
- a data driver arranged to drive a display panel with the video data;
- a clock modulator arranged to modulate the data clock to provide a first modulated clock having a frequency which is varied within a frequency band of about ±x% of the data clock frequency where $1 \leq x \leq 50$; and
- a data scaler responsive to the data clock to scale the video data from the data input and responsible to the first modulated clock to supply the scaled video data to the data driver such that a transmission speed is varied within a certain range, wherein the data scaler generates a second modulated clock synchronized with the first modulated clock and outputs the second modulated clock,
- wherein the data driver simultaneously transfers the scaled video data to the display panel in response to the second modulated clock.

17. The monitor apparatus as claimed in claim 16, wherein the display panel includes a liquid crystal display panel.

18. A monitor apparatus, comprising:
- a signal converter arranged to convert an analog video signal into digital video data;
- a data driver arranged to drive a monitor with the video data;
- a clock generator arranged to generate a sampling clock;
- a clock modulator arranged to modulate the sampling clock into a first modulated clock having a frequency which is varied within a frequency band of about ±x% of the sampling clock frequency where $1 \leq x \leq 50$ and to apply the first modulated clock to the signal converter, to thereby vary a transmission speed of the digital data within a certain speed range, wherein the signal converter receives the first modulated clock, and generates a second modulated clock having a desired phase difference from the first modulated clock and outputs the second modulated clock; and
- a data scaler responsive to the second modulated clock and arranged to scale the video data from the signal converter and to supply the scaled video data to the data driver, wherein the data scaler generates a third modulated clock having a desired phase difference from the second modulated clock and outputs the third modulated clock to the data driver,
- wherein the data driver simultaneously transfers the scaled video data to the display panel in response to the third modulated clock.

19. The monitor apparatus as claimed in claim 18, wherein the display panel includes a liquid crystal panel.

\* \* \* \* \*